US011493469B2

(12) United States Patent
Hwang et al.

(10) Patent No.: US 11,493,469 B2
(45) Date of Patent: Nov. 8, 2022

(54) SENSOR

(71) Applicant: LG ELECTRONICS INC., Seoul (KR)

(72) Inventors: Insung Hwang, Seoul (KR); Byungkee Lee, Seoul (KR); Yunguk Jang, Seoul (KR); Sunjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 607 days.

(21) Appl. No.: 16/339,973

(22) PCT Filed: Nov. 18, 2016

(86) PCT No.: PCT/KR2016/013369
§ 371 (c)(1),
(2) Date: Apr. 5, 2019

(87) PCT Pub. No.: WO2018/066752
PCT Pub. Date: Apr. 12, 2018

(65) Prior Publication Data
US 2020/0041435 A1    Feb. 6, 2020

(30) Foreign Application Priority Data

Oct. 6, 2016  (KR) .......................... 10-2016-0129200

(51) Int. Cl.
*G01N 27/16*   (2006.01)
*G01N 25/00*   (2006.01)
(Continued)

(52) U.S. Cl.
CPC ........... *G01N 27/16* (2013.01); *G01N 25/005* (2013.01); *G01N 27/125* (2013.01); *G01N 27/301* (2013.01)

(58) Field of Classification Search
CPC .... G01N 27/16; G01N 27/125; G01N 27/301; G01N 25/005
See application file for complete search history.

(56) References Cited

U.S. PATENT DOCUMENTS

2006/0032745 A1*  2/2006  Davies ............... G01N 27/16
                                                  204/431
2012/0297880 A1   11/2012  Izawa et al.
(Continued)

FOREIGN PATENT DOCUMENTS

EP          2533037 A1    12/2012
JP        2016-151472 A    8/2016
(Continued)

OTHER PUBLICATIONS

Lv, Pin, et al. "Study on a micro-gas sensor with SnO2—NiO sensitive film for indoor formaldehyde detection." Sensors and Actuators B: Chemical 132.1 (2008): 74-80. (Year: 2008).*

(Continued)

*Primary Examiner* — Robert J Eom
(74) *Attorney, Agent, or Firm* — Birch, Stewart, Kolasch & Birch, LLP

(57) ABSTRACT

A sensor is disclosed. The sensor according to an embodiment of the present invention may include a substrate; a first electrode pattern disposed on one side of the substrate to form a layer; a second electrode pattern disposed on the one side of the substrate to form a layer and separated from the first electrode pattern; a sensing layer located on the one side of the substrate and covering the first electrode pattern and the second electrode pattern and containing a semiconductor; a protective layer located on the one side of the substrate and covering at least a part of the sensing layer, and containing a material different from that of the sensing layer; a first electrode pad disposed on the one side of the substrate to form a layer and electrically connected to the first (Continued)

electrode pattern; a second electrode pad disposed on the one side of the substrate and electrically connected to the second electrode pattern; and a housing accommodating the substrate and including a filter spaced apart from the substrate, wherein the substrate includes an opening formed adjacent to an outer boundary of the first and second electrode patterns.

12 Claims, 19 Drawing Sheets

(51) Int. Cl.
    *G01N 27/12*      (2006.01)
    *G01N 27/30*      (2006.01)

(56) References Cited

U.S. PATENT DOCUMENTS

2015/0198551 A1    7/2015   Jun et al.
2016/0077028 A1    3/2016   Beck et al.

FOREIGN PATENT DOCUMENTS

| KR | 10-2001-0026345 A | 4/2001 |
| KR | 10-2010-0101046 A | 9/2010 |
| KR | 10-2014-0074269 A | 6/2014 |
| KR | 10-2016-0035820 A | 4/2016 |
| WO | WO 2016/142080 A1 | 9/2016 |

OTHER PUBLICATIONS

Hubálek, J., et al. "Pt-loaded Al2O3 catalytic filters for screen-printed WO3 sensors highly selective to benzene." Sensors and Actuators B: Chemical 101.3 (2004): 277-283. (Year: 2004).*

Norman, Aaron, et al. "Packaging effects of a novel explosion-proof gas sensor." Sensors and Actuators B: Chemical 95.1-3 (2003): 287-290. (Year: 2003).*

Lutz, Brent, et al. "Development of Ultra-Low Power Metal Oxide Sensors and Arrays for Embedded Applications." AIP Conference Proceedings. vol. 1362. No. 1. American Institute of Physics, 2011. (Year: 2011).*

* cited by examiner

[FIG. 1]
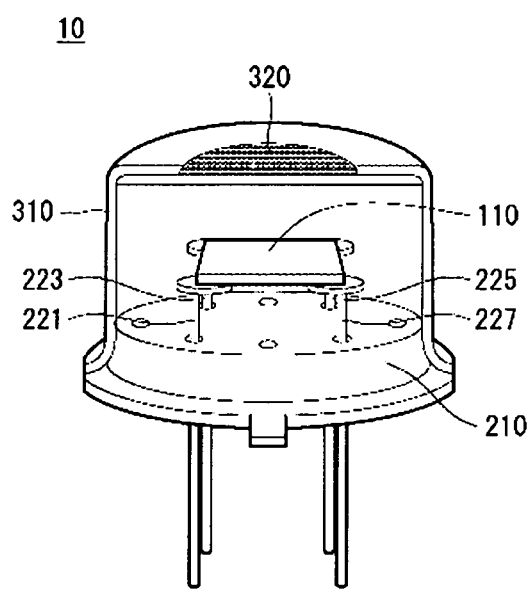

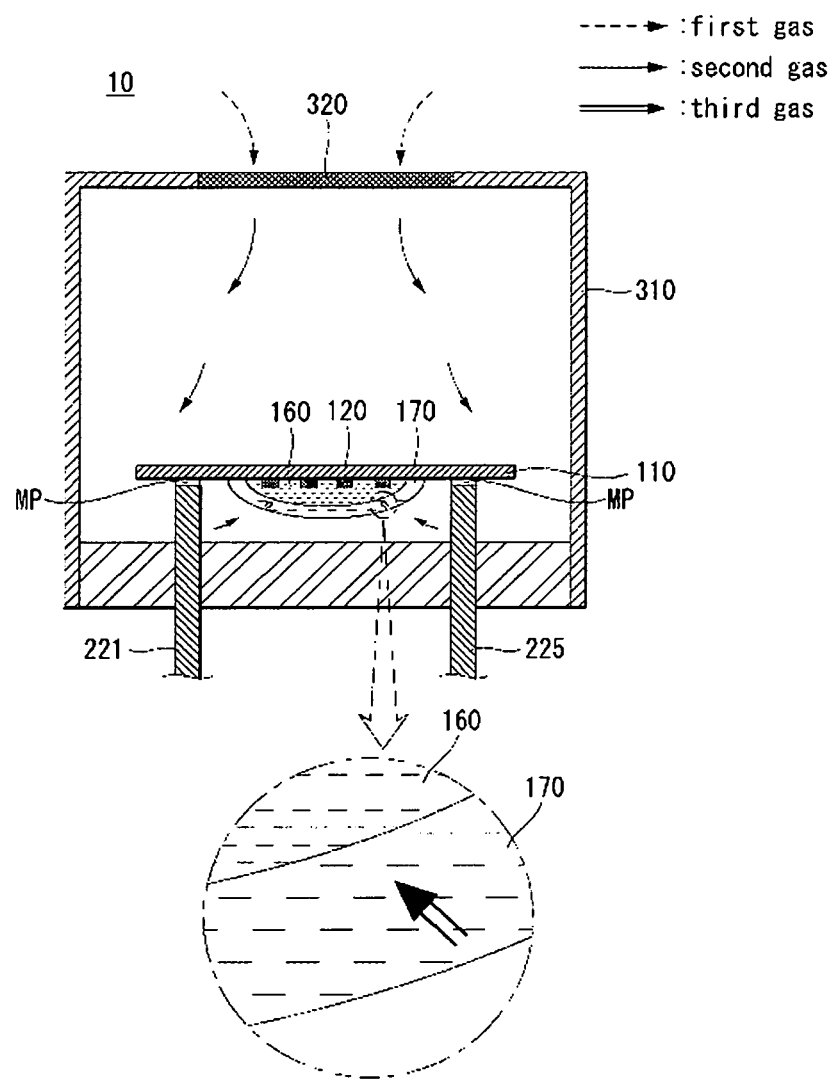
[FIG. 2]

[FIG. 3]
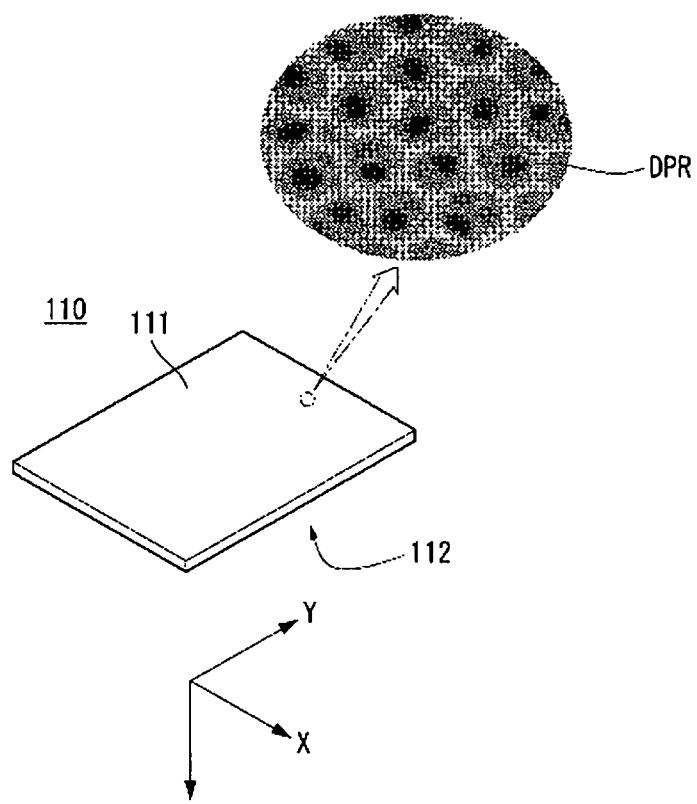

[FIG. 4]
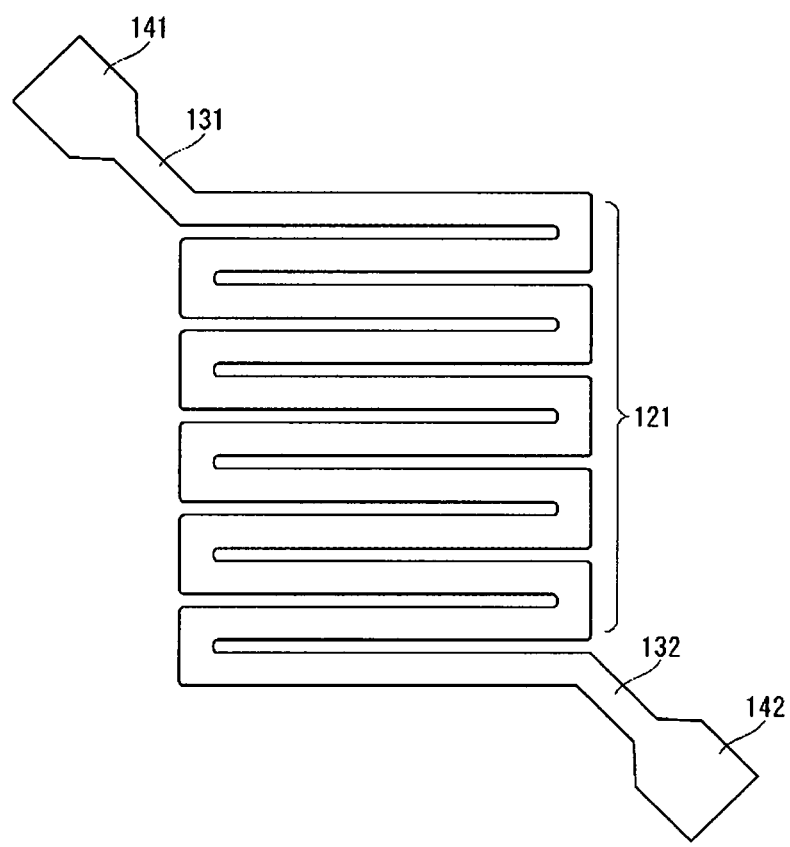

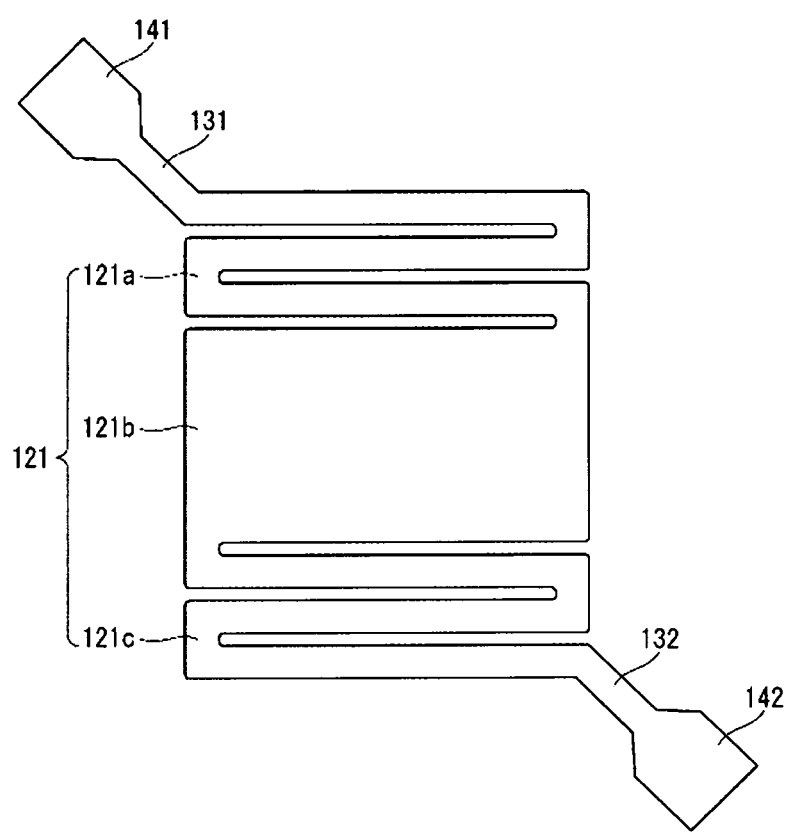

[FIG. 6]
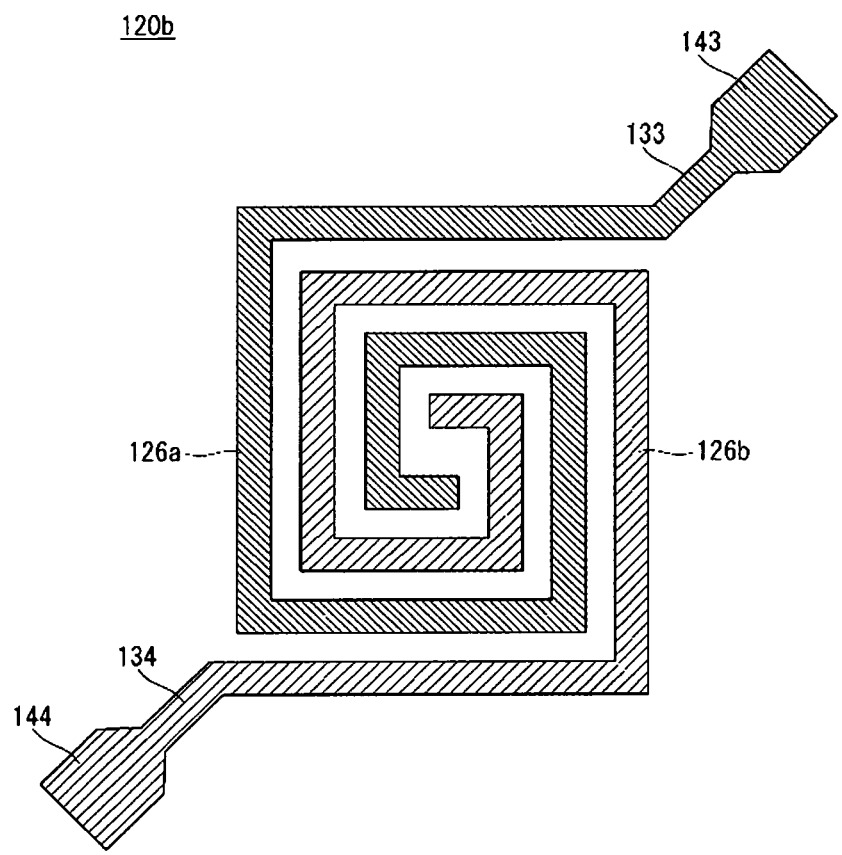

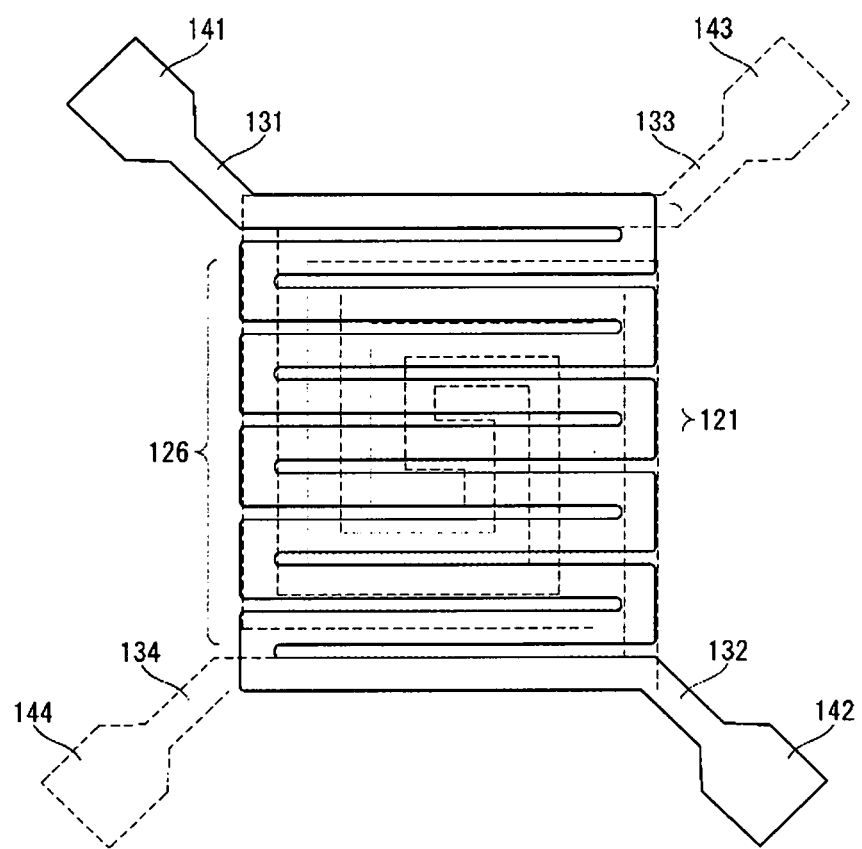
[FIG. 7]

[FIG. 8]
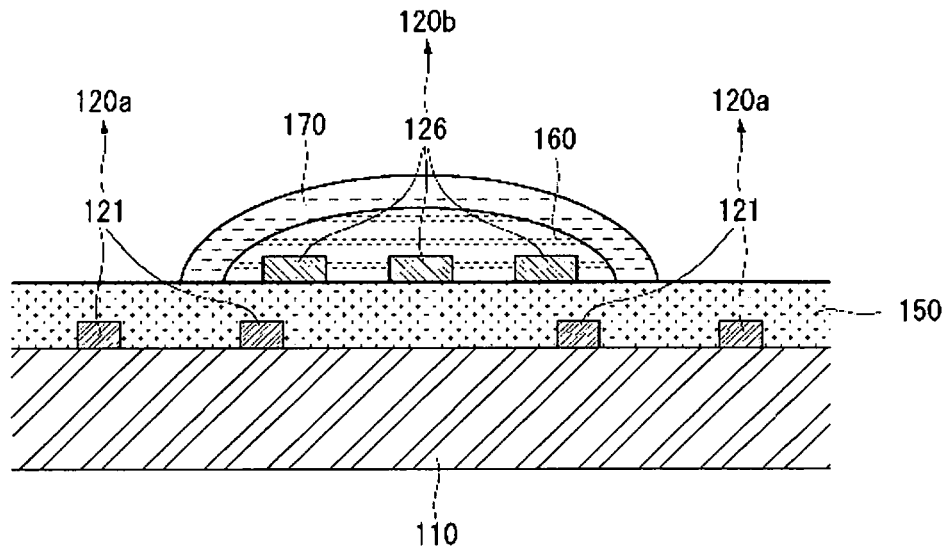
[FIG. 9]
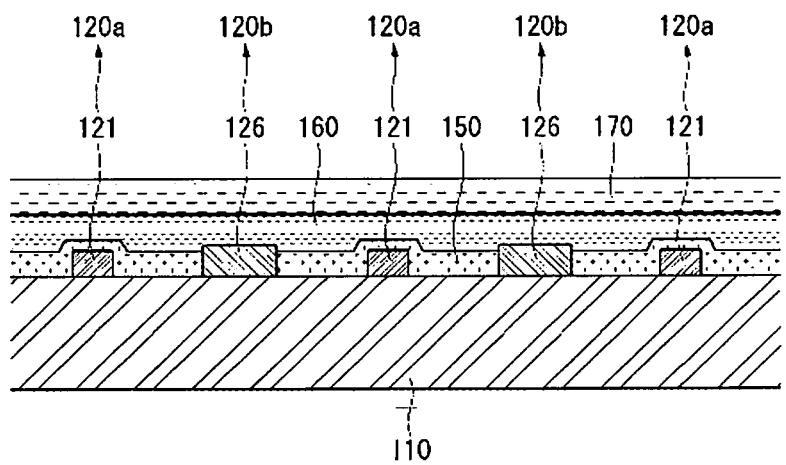

[FIG. 10]
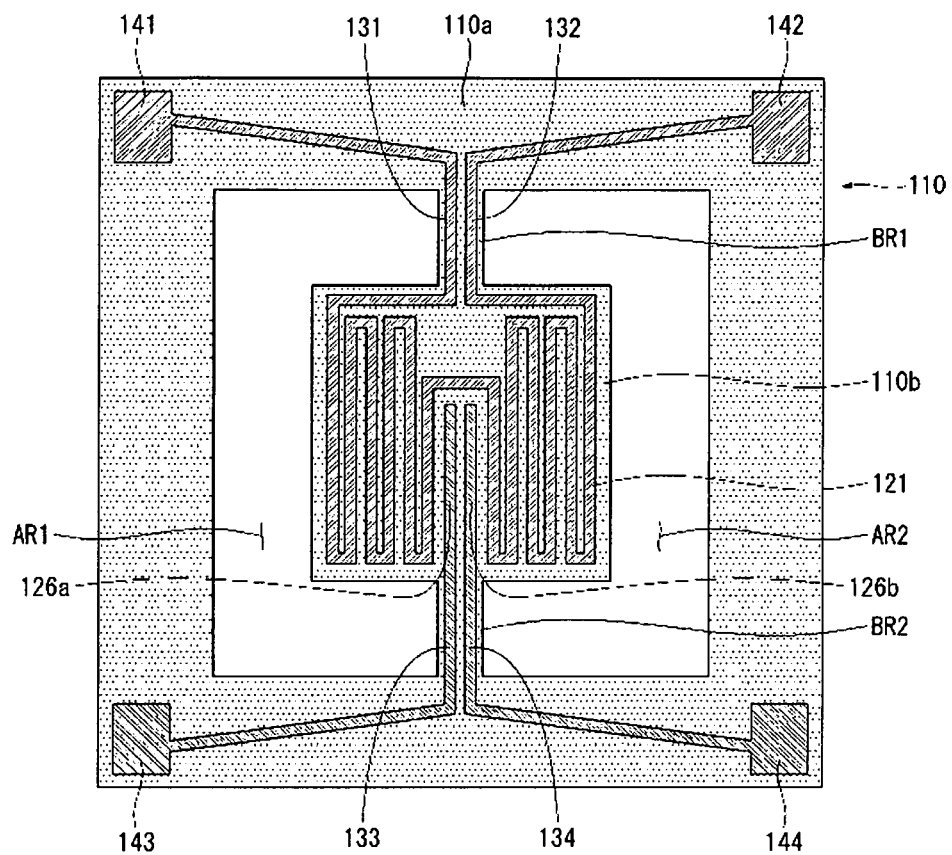

[FIG. 11]
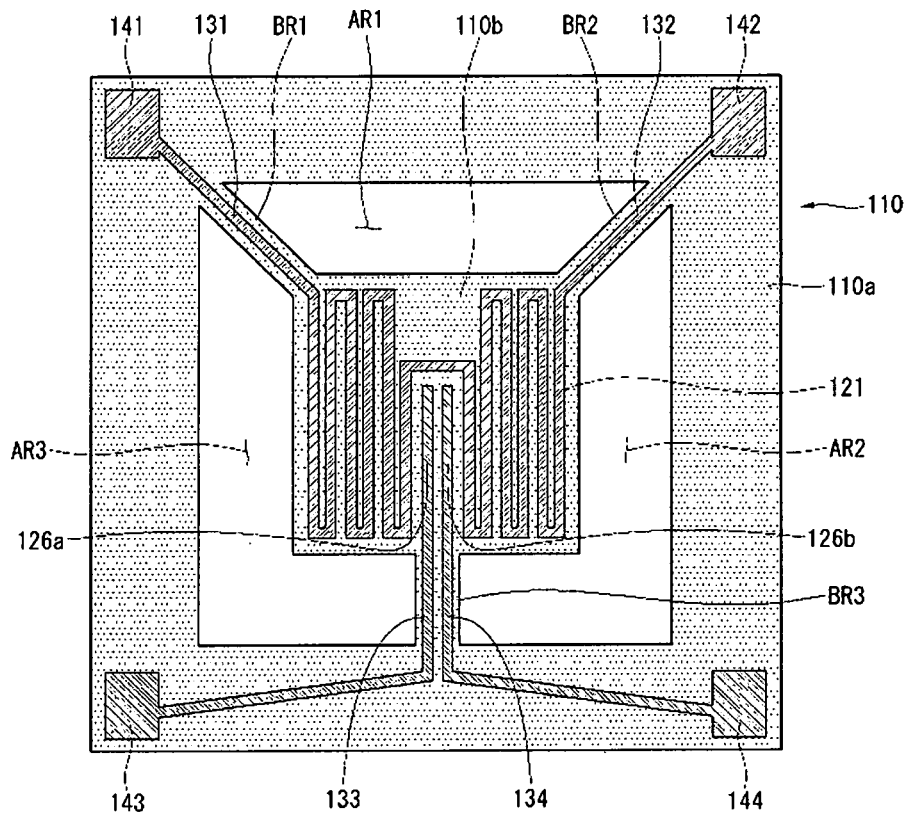

[FIG. 12]
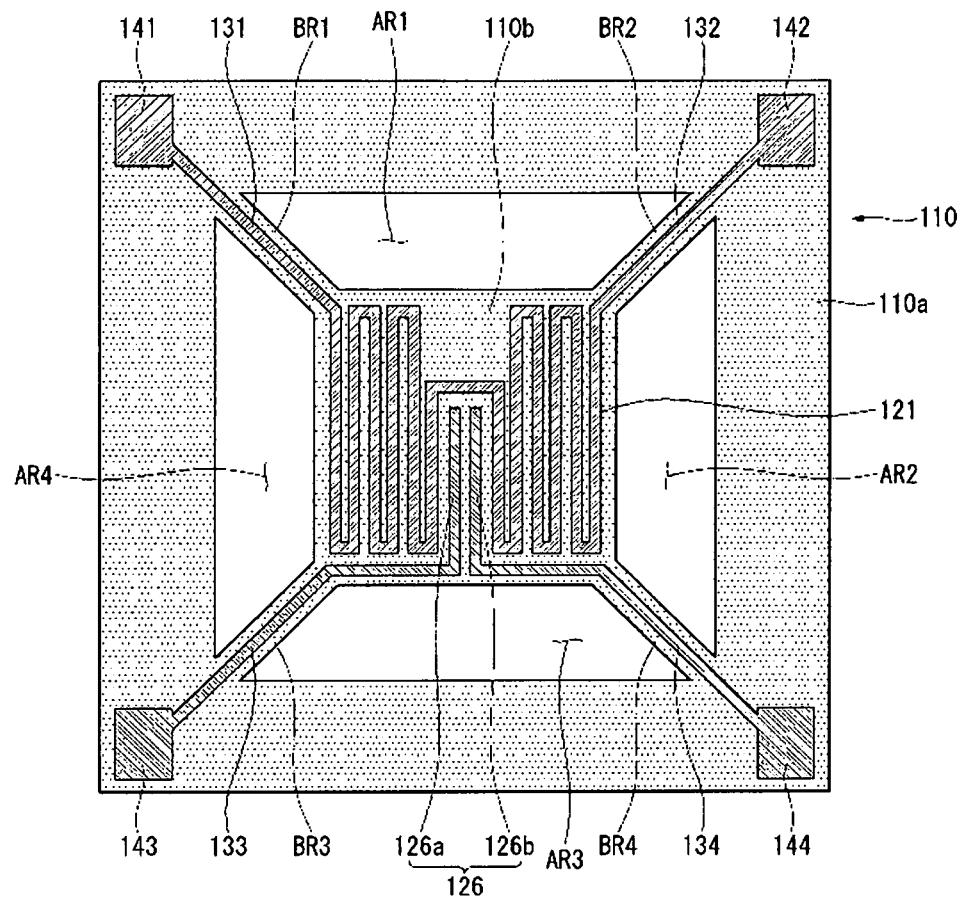

[FIG. 13]
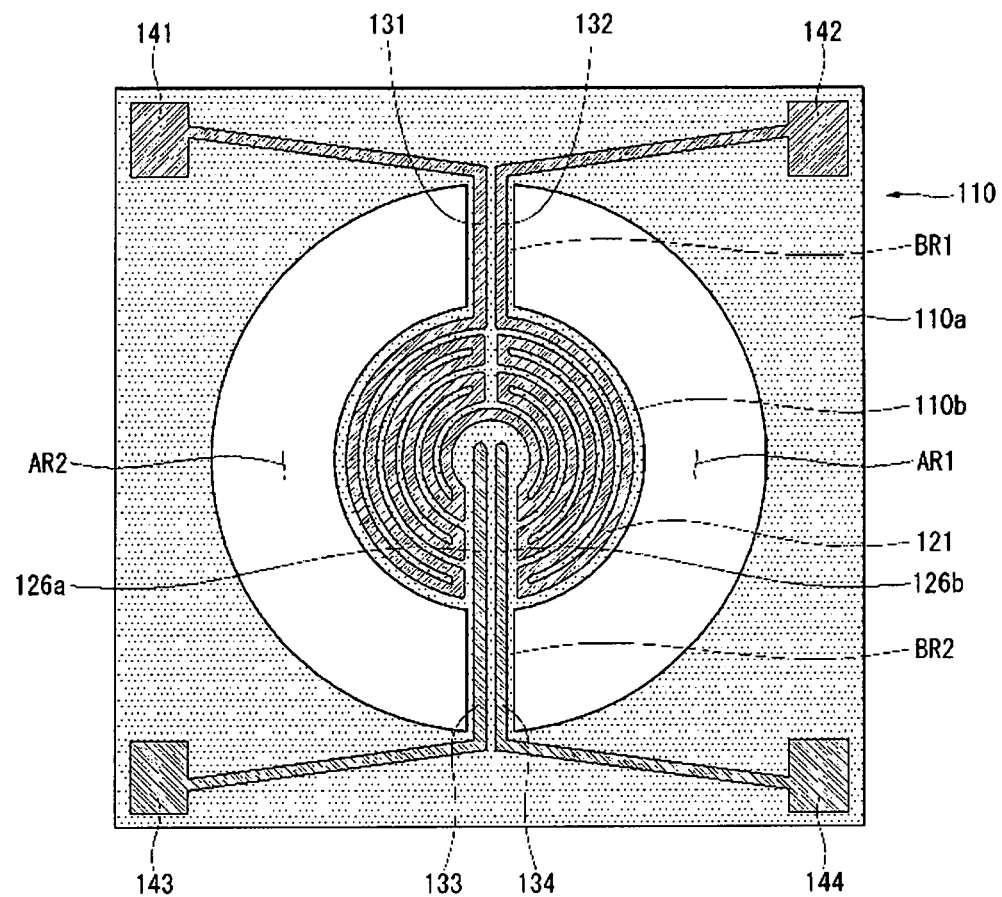

[FIG. 14]
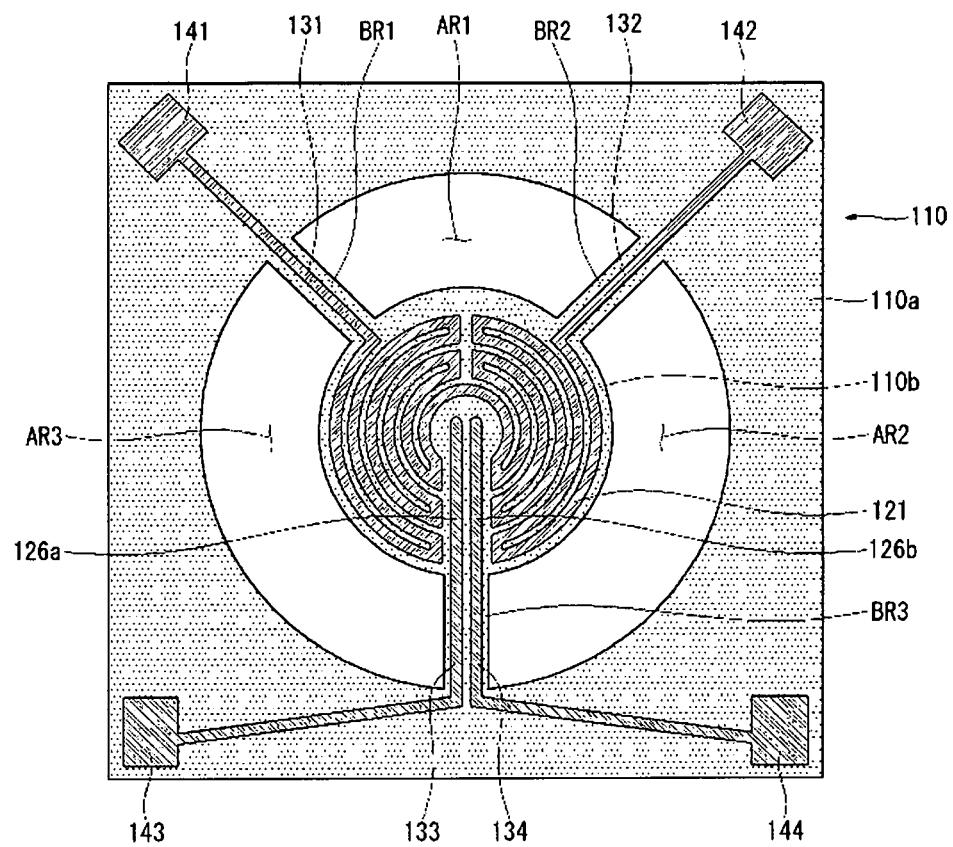

[FIG. 15]
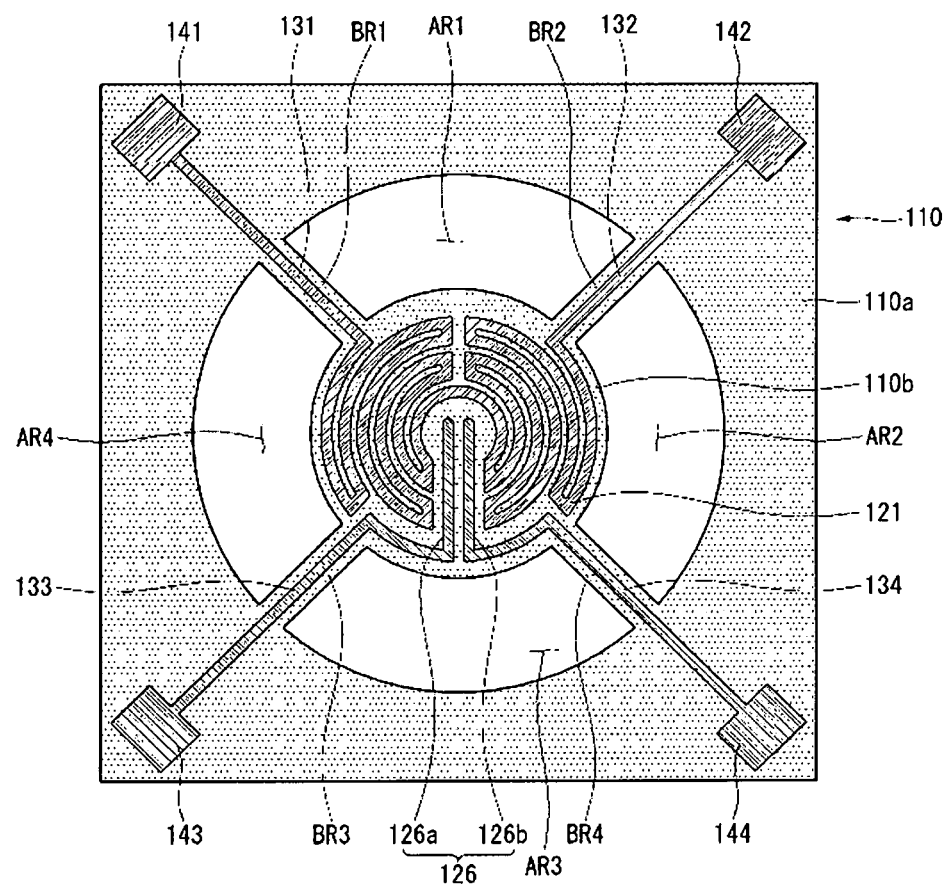

[FIG. 16]
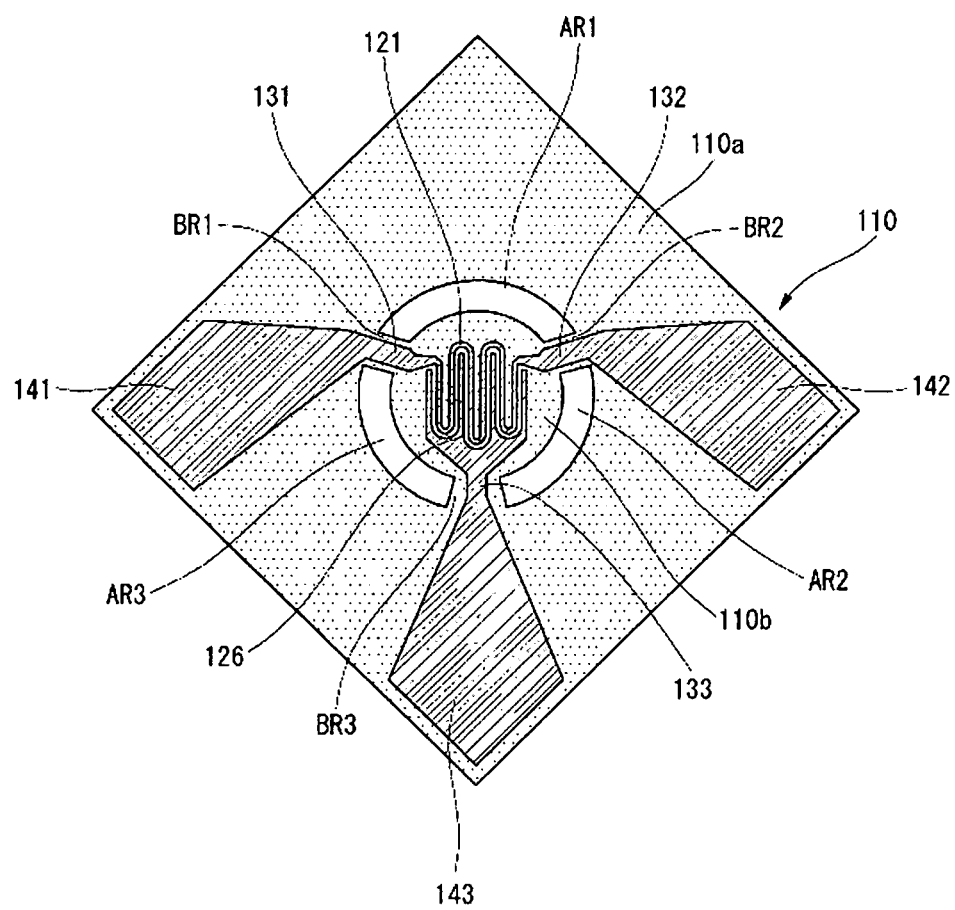

[FIG. 17]
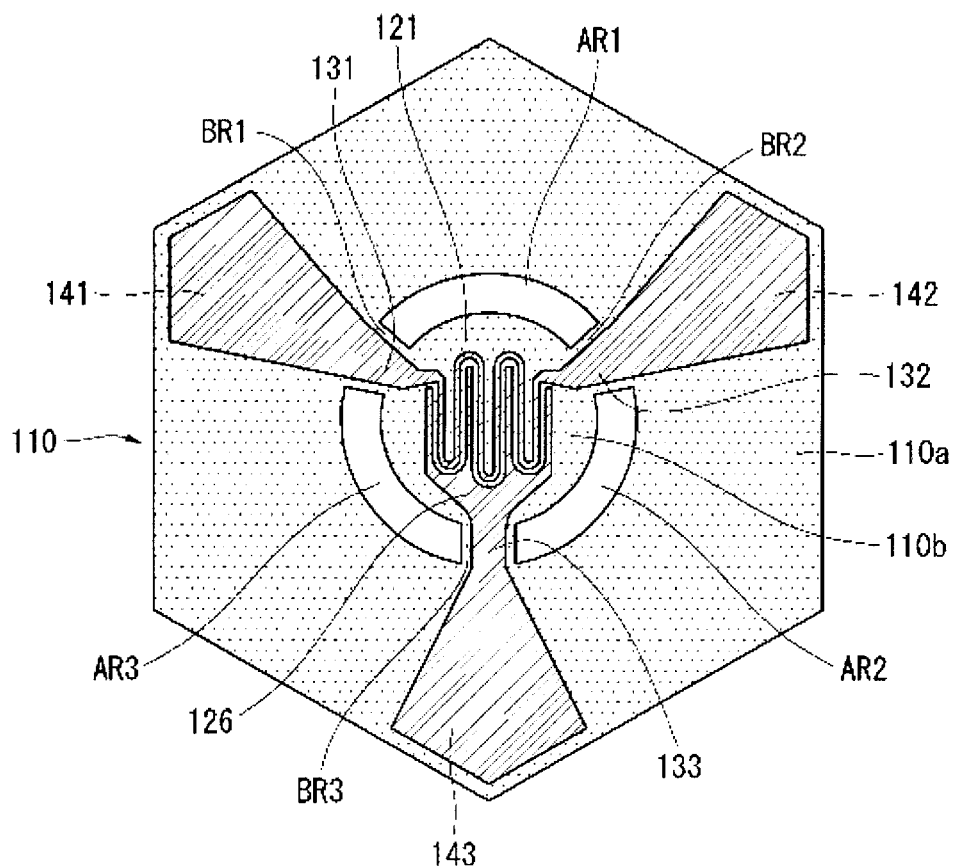
[FIG. 18]
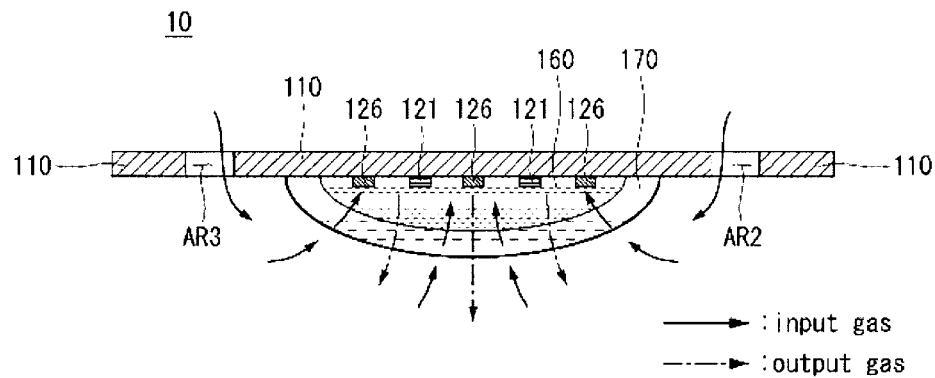

[FIG. 19]
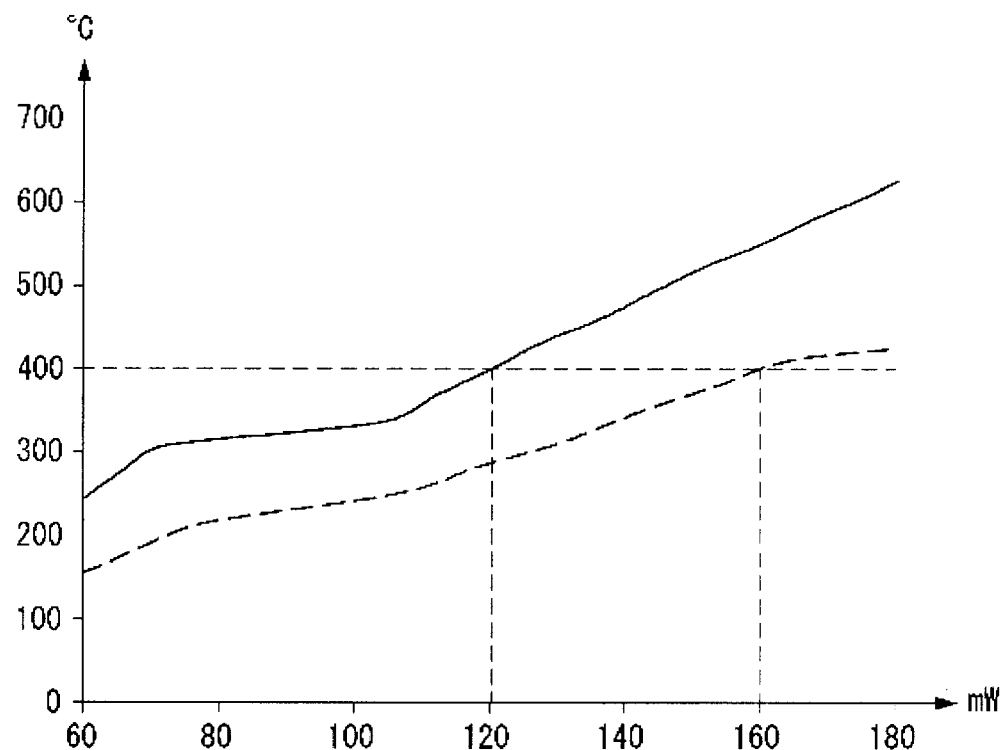
[FIG. 20]
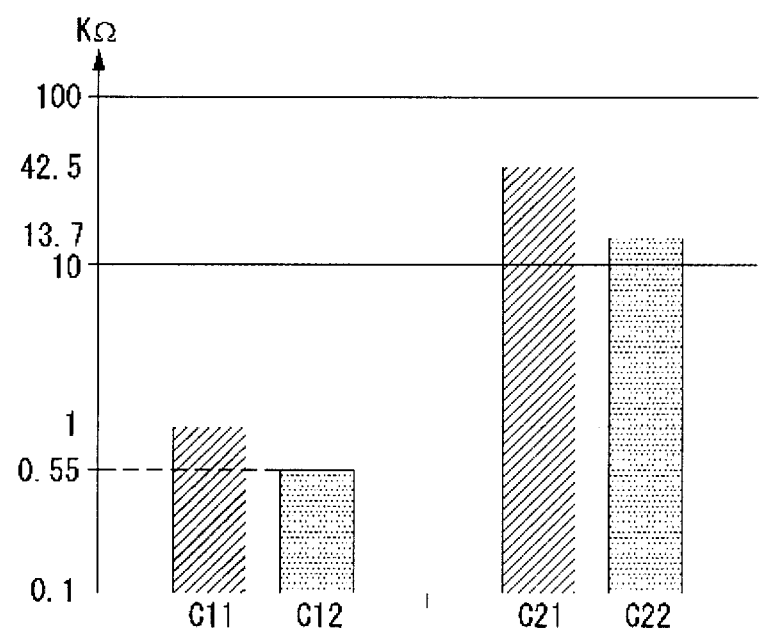

[FIG. 21]
(a) 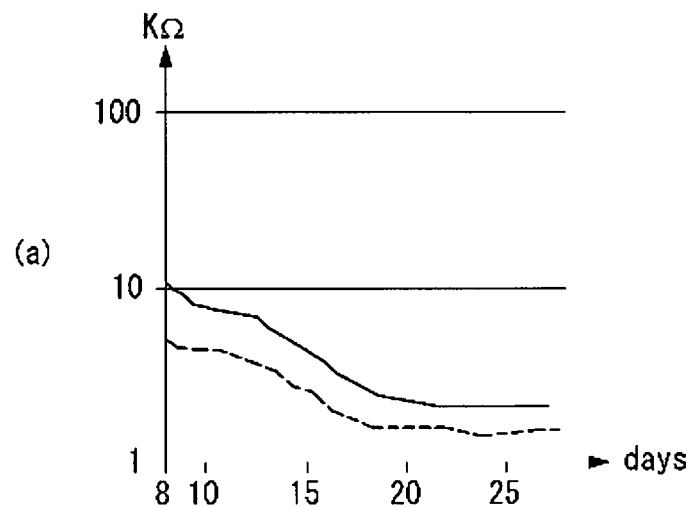
(b) 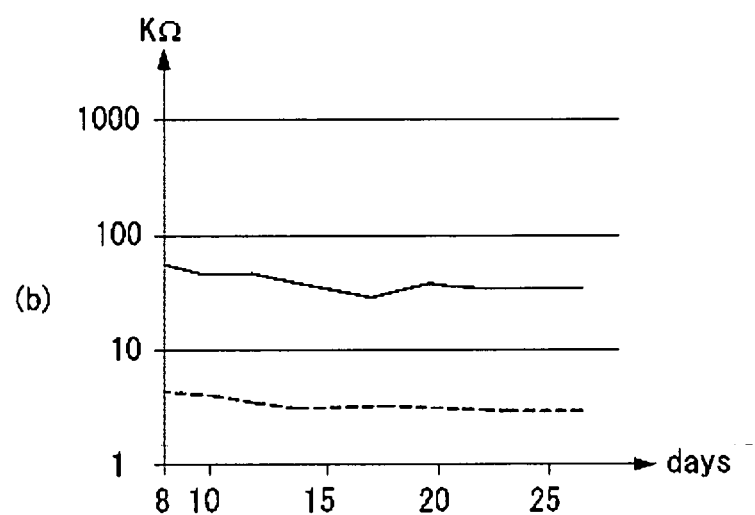

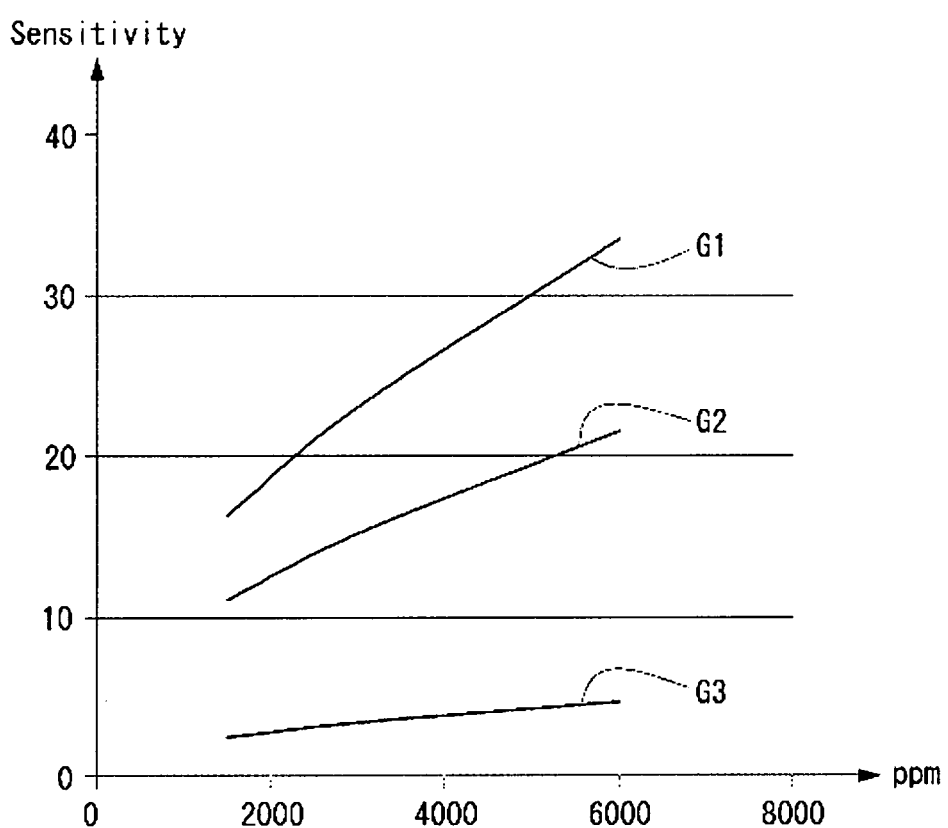
[FIG. 22]

SENSOR

CROSS REFERENCE TO RELATED APPLICATIONS

This application is the National Phase of PCT International Application No. PCT/KR2016/013369, filed on Nov. 18, 2016, which claims priority under 35 U.S.C. 119(a) to Patent Application No. 10-2016-0129200, filed in Republic of Korea on Oct. 6, 2016, all of which are hereby expressly incorporated by reference into the present application.

TECHNICAL FIELD

The present invention relates to a sensor, and more particularly, to a gas sensor capable of sensing a gas.

BACKGROUND ART

A sensor senses a state or a change in the state in a given environment, and provides a corresponding signal. The sensor is a type of transducer that can provide various types of signals but can provide mainly electrical or optical signals.

A gas sensor is a device that can sense composition of a gas or distribution of the gas in a given environment. The gas sensor is very important because they can sense many gases that can be harmful to living things such as humans and animals.

Recently, with development of miniaturization technology, such a sensor has been downsized, and the size of the sensor has been reduced from millimeter to micrometer unit. The miniaturization technology of the sensor can be used not only to reduce the size of the sensor finely but also to maintain sensitivity of the sensor, responsiveness of the sensor, durability of the sensor, and economical efficiency of sensor manufacturing.

DETAILED DESCRIPTION OF INVENTION

Technical Problem

The present invention aims to solve the above-mentioned problems and other problems. Another object may be to provide a gas sensor capable of improving gas sensitivity characteristics.

A third object may be to provide a gas sensor capable of improving durability.

A fourth object may be is to provide a gas sensor in which gas can easily flow into or out of the sensor.

The fifth object may be to provide a gas sensor that removes an input noise gas.

Technical Solution

According to one aspect of the present disclosure, there is provided a sensor including a substrate; a first electrode pattern disposed on one side of the substrate to form a layer; a second electrode pattern disposed on the one side of the substrate to form a layer and separated from the first electrode pattern; a sensing layer located on the one side of the substrate and covering the first electrode pattern and the second electrode pattern and containing a semiconductor; a protective layer located on the one side of the substrate and covering at least a part of the sensing layer, and containing a material different from that of the sensing layer; a first electrode pad disposed on the one side of the substrate to form a layer and electrically connected to the first electrode pattern; a second electrode pad disposed on the one side of the substrate and electrically connected to the second electrode pattern; and a housing accommodating the substrate and including a filter spaced apart from the substrate, wherein the substrate includes an opening formed adjacent to an outer boundary of the first and second electrode patterns.

Advantageous Effects

According to at least one of embodiments of the present invention, it is possible to provide a gas sensor capable of improving gas sensitivity characteristics.

According to at least one of embodiments of the present invention, it is possible to provide a gas sensor capable of improving durability.

According to at least one of embodiments of the present invention, it is possible to provide a gas sensor in which gas can easily flow into or out of the sensor.

According to at least one of embodiments of the present invention, it is possible to provide a gas sensor that removes a noise gas.

DESCRIPTION OF DRAWINGS

FIGS. 1 and 2 are diagrams illustrating a gas sensor according to an embodiment of the present invention.

FIG. 3 is a diagram illustrating a substrate according to an embodiment of the present invention.

FIGS. 4 to 7 are diagrams illustrating examples of electrodes 120 according to an embodiment of the present invention.

FIGS. 8 and 9 are diagrams illustrating examples of cross sections of a sensor according to an embodiment of the present invention.

FIGS. 10 to 17 are diagrams illustrating examples of sensors according to an embodiment of the present invention.

FIG. 18 is a diagram illustrating a cross section of a sensor including a substrate on which an opening is formed according to an embodiment of the present invention.

FIGS. 19 to 22 are diagrams illustrating examples of sensing effects of a sensor according to an embodiment of the present invention.

MODE FOR INVENTION

Hereinafter, embodiments of the present invention will be described in detail with reference to the accompanying drawings, however, the same or similar elements are denoted by the same reference numerals regardless of the reference numerals, and redundant description thereof will be omitted.

The suffixes "module" and "part" for components used in the following description are given or mixed in consideration of ease of specification, and do not have their own meaning or role.

Further, in describing the embodiments disclosed in this specification, when it is determined that the detailed description of the related art is likely to blur the gist of the embodiment disclosed in this specification, a detailed description thereof will be omitted.

Also, the accompanying drawings are only for the purpose of easily understanding the embodiments disclosed in the present specification, and the technical idea disclosed in the present specification is not limited by the accompanying drawings, it should be understood that the present invention include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Gas sensors may be classified into solid electrolyte type, contact combustion type, electrochemical type, and semiconductor type sensors. The semiconductor type gas sensor may be referred to as a semiconductor type micro gas sensor. When a specific gas is adsorbed to a sensing material of the sensor, the semiconductor type gas sensor can detect presence or absence of gas above a certain concentration by measuring a change in electrical conductivity of the sensing material.

Hereinafter, the semiconductor type gas sensor will be described as an example, but the use of the above-mentioned other types of gas sensors is not excluded.

The gas sensor can sense carbon monoxide (CO), methane ($CH_4$), ethanol ($CH_2H_6O$), and the like. The types of gases that can be detected or sensed by the gas sensor vary widely and are not limited to the gases mentioned above.

In other words, the gas sensor can detect or sense harmless or beneficial gases to the human body as well as harmful gases to the human body. For example, the gas sensor can sense air quality in a given environment, which means that the air quality can include beneficial gases such as oxygen as well as harmful gases.

FIGS. 1 and 2 are diagrams illustrating a gas sensor 10 according to an embodiment of the present invention.

Referring to FIG. 1, a plate 210 appears. A cap 310 may be mounted on top of the plate 210. A filter 320 may be located on one side of the cap 310. The plate 210 and the cap 310 may form an inner space. Connection parts 221, 223, 225, and 227 may be located in the inner space (hereinafter, referred to as 'inner space') formed by the plate 210 and the cap 310. The plate 210 and the cap 310 may be a housing having the inner space. The housing 210 and 310 can accommodate a substrate 110. The cap 310 may be made of metal.

At least one hole may be formed in the plate 210. The connection parts 221, 223, 225, and 227 may pass through the holes formed in the plate 210. The hole formed in the plate 210 may be a passage through which gases pass.

The connection parts 221, 223, 225, and 227 passing through the holes may be electrically connected to other electronic components. The other electronic components may be, for example, a data acquisition device (DAQ device) and/or an alarm device.

The connection parts 221, 223, 225 and 227 may be physically and/or electrically connected to the substrate 110 in the inner space formed by the plate 210 and the cap 310. The connection parts 221, 223, 225 and 227 and the substrate may be fixed by metal paste.

A sensing material (not shown) for sensing a gas and an electrode (not shown) electrically connected to the sensing material (not shown) may be stacked on one side of the substrate 110. The gas input from the top of the cap 310 may react with the sensing material (not shown) stacked on the substrate 110 to affect the electrode (not shown).

FIG. 2 may be a cross-sectional view of FIG. 1. Referring to FIG. 2, an external gas may pass through the filter 320 installed in the cap 310. The external gas may be referred to as a first gas. The first gas may pass through the filter 320 and become a second gas. The second gas may mean a gas other than a gas filtered by the filter 320 in the first gas. A gas to be sensed by the sensor 10 may be referred to as a target gas. A noise gas may mean a gas which may cause a malfunction of the sensor 10 or/and a gas which lowers sensitivity of the sensor 10. The gas filtered by the filter 320 may be the noise gas.

The filter 320 may include carbon fibers. Silicon dioxide ($SiO_2$) or the like may be adsorbed on the carbon fibers contained in the filter 320. The silicon dioxide adsorbed on the carbon fibers contained in the filter 320 may be coated on the carbon fibers in a sol state. The filter 320 may, for example, adsorb ethanol to remove at least a part of the noise gas.

For example, the target gas may be a hydrofluorocarbon (HFC) gas. The HFC gas may be used as a refrigerant gas. The HFC gas may be, for example, $CF_2H_2$ or/and $CHF_2CF_3$. For example, the noise gas may be a hydroxyl group. For example, the noise gas may be an ethanol gas and/or a methanol gas. The second gas may mean a gas in a state in which at least a part of the noise gas is removed from the first gas. The second gas may move toward the substrate 110.

The substrate 110 may be electrically connected to the connection parts 221 and 225. For example, the metal paste MP may electrically connect the substrate 110 to the connection parts 221 and 225. Further the metal paste MP may fix the substrate 110 to the connection parts 221 and 225.

The electrode 120 may be stacked on one side of the substrate 110. The electrode 120 may include a pattern (not shown) formed on the substrate 110. The electrode 120 may be electrically connected to the connection parts 221 and 225. A sensing layer 160 may be stacked on one side of the substrate 110 while covering at least a part of the electrode 120. The sensing layer 160 may be in contact with the electrode 120. The sensing layer 160 may be responsive to a gas above a certain temperature. For example, the sensing layer 160 may be responsive to a gas at about 300° C. or more. The electrode 120 may provide heat to the sensing layer 160. Thermal conductivity of the substrate 110 may be related to energy efficiency of the sensor 10.

At least a part of the electrode 120 and the sensing layer 160 may constitute a sensing circuit (not shown). Here, the sensing circuit (not shown) may refer to a circuit that obtains another electric signal depending on whether or not it is reacted with the gas. The sensing layer 160 can react with the target gas. An electrical signal obtained by the sensing circuit (not shown) when the sensing layer 160 reacts with the target gas may be different from an electrical signal obtained by the sensing circuit (not shown) when the sensing layer 160 does not react with the target gas.

A protective layer 170 may be stacked on one side of the substrate 110 while covering the sensing layer 160. The protective layer 170 can filter the gas. For example, the protective layer 170 may filter the second gas input into the inner space to provide a third gas to the sensing layer 160. The third gas may mean a gas in a state in which at least a part of the noise gas is removed from the second gas. A content ratio of the target gas contained in the third gas may be greater than a content ratio of the target gas contained in the second gas. By the protective layer 170, a sensitivity characteristic of the sensor 10 can be improved.

FIG. 3 is a diagram illustrating a substrate according to an embodiment of the present invention. Referring to FIG. 3, a substrate 110 may have a flat plate shape. A thickness of the substrate 110 may be thin. That is, the substrate 110 may be a thin film type. The substrate 110 may be porous. The substrate 110 may include anodized aluminum oxide (AAO).

The substrate 110 may include one side 111 and other side 112. In FIG. 3, the one side 111 of the substrate is observed. The other side 112 of the substrate may mean an opposite side of the one side 111 of the substrate.

Referring to FIG. 3, a part of the one side 111 of the substrate is enlarged. A plurality of depressions DPR may be formed on a surface of the one side 111 of the substrate 110. The depression (DPR) may be in a form of an empty space inside the substrate 110. The empty space may be formed on the surface and inside of the substrate 110, and the empty space may have an effect of blocking heat.

FIGS. 4 to 7 are diagrams illustrating examples of electrodes 120 according to an embodiment of the present invention.

Referring to FIG. 4, a first electrode pattern 121, connection electrodes 131 and 132, and first electrode pads 141 and 142 are observed. The first electrode pattern 121, the connection electrodes 131 and 132 and the first electrode pads 141 and 142 may form a heating electrode 120a.

The first electrode pattern 121 may be formed of metal having an electrical resistance. For example, the first electrode pattern 121 may include platinum. For example, the first electrode pattern 121 may have a resistance of 100Ω.

The first electrode pattern 121 may wind. The first electrode pattern 121 may be bent at a plurality of strokes. Accordingly, the first electrode pattern 121 can increase a heat generating area per unit area.

The first electrode pads 141 and 142 may be provided with a plurality of pads. For example, the first electrode pads 141 and 142 may include a first heating electrode pad 141 and a second heating electrode pad 142. The first heating electrode pad 141 may be electrically connected to one side of the first electrode pattern 121 and the second heating electrode pad 142 may be electrically connected to the other side of the first electrode pattern 121.

The connection electrodes 131 and 132 may electrically connect the first electrode patterns 121 to the first electrode pads 141 and 142. For example, a first connection electrode 131 may electrically connect the first electrode pattern 121 to the first heating electrode pad 141. For example, a second connection electrode 132 may electrically connect the first electrode pattern 121 to the second heating electrode pad 142.

The first electrode pattern 121, the connection electrodes 131 and 132, and the first electrode pads 141 and 142 may be formed as one unit. For example, the first electrode pattern 121, the connection electrodes 131 and 132, and the first electrode pads 141 and 142 may be formed on one side of the substrate 110 (see FIG. 3) by screen printing.

Referring to FIG. 5, the first electrode pattern 121 may include a flat plate part 121b and winding parts 121a and 121c. The flat plate part 121b may be a flat plate of a thin film. The winding parts 121a and 121c may include a first winding part 121a and a second winding part 121c. The first winding part 121a may be connected to one side of the flat plate part 121b. The second winding part 121c may be connected to the other side of the flat plate portion 121b. The flat plate part 121b may be located between the first winding part 121a and the second winding part 121c. The flat plate part 121b and the winding parts 121a and 121c may be formed as one unit.

Referring to FIG. 6, a second electrode pattern 126a, a third electrode pattern 126b, a second electrode pad 143, a third electrode pad 144, a third connection electrode 133, and a fourth connection electrode 134 appear. The second electrode pattern 126a, the third electrode pattern 126b, the second electrode pad 143, the third electrode pad 144, the third connection electrode 133, and the fourth connection electrode 134 may form a sensing electrode 120b.

The second electrode pattern 126a, the third electrode pattern 126b, the second electrode pad 143, the third electrode pad 144, the third connection electrode 133, and the fourth connection electrode 134 may form a part of a sensing circuit (not shown). The second electrode pattern 126a, the third electrode pattern 126b, the second electrode pad 143, the third electrode pad 144, the third connection electrode 133, and the fourth connection electrode 134 may be formed on one side of the substrate 110 (see FIG. 3) by screen printing.

The second electrode pattern 126a may wind. The third electrode pattern 126b may wind in a pair with the second electrode pattern 126a. The third electrode pattern 126b may be spaced apart from the second electrode pattern 126a or separated from the second electrode pattern 126a. That is, the third electrode pattern 126b may not be connected to the second electrode pattern 126a. The second electrode pattern 126a and the third electrode pattern 126b may form a maze shape.

One side of the second electrode pattern 126a may be electrically connected to the second electrode pad 143 through the third connection electrode 133. One side of the third electrode pattern 126b may be electrically connected to the third electrode pad 144 through the fourth connection electrode 134.

The sensing layer 160 (see FIG. 2) may connect the second electrode pattern 126a to the third electrode pattern 126b. Physical properties of the sensing layer 160 (see FIG. 2) may vary depending on reaction with the gas. Electrical signal or electrical connection between the second electrode pattern 126a and the third electrode pattern 126b may vary depending on the physical properties of the sensing layer 160 (see FIG. 2).

Referring to FIG. 7, the heating electrode 120a may overlap the sensing electrode 120b. The heating electrode 120a may be adjacent to the sensing electrode 120b to provide heat to the sensing layer 160 (see FIG. 2). The sensing electrode 120b can detect or sense gas at or above a certain temperature.

FIGS. 8 and 9 are diagrams illustrating examples of cross sections of a sensor according to an embodiment of the present invention.

Referring to FIG. 8, at least a part of the heating electrode 120a may be stacked on the substrate 110. For example, the first electrode pattern 121 may be stacked on the substrate 110. An insulating layer 150 may cover at least a part of the first electrode pattern 121. The insulating layer 150 may electrically insulate the heating electrode 120a from the sensing electrode 120b. The insulating layer 150 may electrically insulate the heating electrode 120a from a sensing layer 160.

The sensing electrode 120b may be located on an upper surface of the insulating layer 150. The sensing electrode 120b may be vertically disposed with respect to the heating electrode 120a. For example, the second electrode pattern 126a or the third electrode pattern 126b may be located on the upper surface of the insulating layer 150 and may be electrically isolated from the heating electrode 120a.

The sensing layer 160 may cover at least a part of the sensing electrode 120b. The sensing layer 160 may cover at least a part of the insulating layer 150. The sensing layer 160 may include an N-type semiconductor. For example, the sensing layer 160 may include tin oxide ($SnO_2$).

At temperatures above a certain temperature, for example above 300° C., a part of the oxygen molecules in the air is decomposed into oxygen atoms, and some of the oxygen atoms may be adsorbed to the sensing layer 160. The oxygen atoms adsorbed to the sensing layer 160 may be oxygen negative ions by obtaining electrons from the sensing layer 160. The sensing layer 160, which has lost the electrons from the oxygen atoms, may form a depletion layer. In this state, the electrical resistance of the sensing layer 160 may be relatively high.

The target gas may be a reducing gas. That is, the target gas may react and/or combine with the oxygen negative ions located on a surface of the sensing layer 160 to provide the electrons to the sensing layer 160. The electrical resistance of the sensing layer 160, which has received the electrons from the target gas, may be relatively low. In other words, the electrical resistance of the sensing layer 160 exposed to the target gas may be lower than the electrical resistance of the sensing layer 160 exposed to ambient air.

The sensing layer 160 may include a P-type semiconductor. For example, the sensing layer 160 may include nickel oxide. The nickel oxide and tin oxide may be a P-N junction. The sensing layer 160 including tin oxide and nickel oxide may contain a relatively large depletion layer.

The sensing layer 160 may react with the target gas by attaching the oxygen negative ions to the surface. A noise gas may be attached to the surface of the sensing layer 160 to prevent the oxygen negative ions from being attached to the sensing layer 160. For example, hydro oxide ions may compete with the oxygen negative ions as the noise gas. When the hydro oxide ions are attached to the sensing layer 160, since a reaction cross section of the target gas and the oxygen negative ions can be reduced, removal of the noise gas may be required. In addition, when the sensing layer 160 is directly exposed to outside, there is a risk of being exposed to various pollutants.

The protective layer 170 may cover at least a part of the sensing layer 160. The protective layer 170 may protect the sensing layer 160 from the noise gases and/or various pollutans. The protective layer 170 may filter the noise gas. The protective layer 170 may filter gases including, for example, the hydroxyl group. For example, the protective layer 170 may filter the ethanol gas and/or the methanol gas.

For example, aluminum oxide (or aluminum oxide) may be included. In addition, the protective layer 170 may include, for example, silicon dioxide. The protective layer 170 may include a metal catalyst. For example, the protective layer 170 may include palladium (Pd) and/or tungsten (W).

Referring to FIG. 9, the heating electrode 120a may be formed on an upper side of the substrate 110. The sensing electrode 120b is formed on the upper side of the substrate 110 and may be separated from the heating electrode 120a. In other words, the sensing electrode 120b may be horizontally disposed with respect to the heating electrode 120a.

The insulating layer 150 may be formed on the upper side of the substrate 110. The insulating layer 150 may insulate the heating electrode 120a from the sensing electrode 120b. The sensing layer 160 may cover at least a part of the sensing electrode 120b. The sensing layer 160 may cover the insulating layer 150. The sensing layer 160 may be electrically connected to the sensing electrode 120b. The sensing layer 160 may be insulated from the heating electrode 120a by the insulating layer 150. The protective layer 170 may cover the sensing layer 160.

FIGS. 10 to 17 are diagrams illustrating examples of sensors according to an embodiment of the present invention.

Referring to FIG. 10, a substrate 110 may have a rectangular shape as a whole. The substrate 110 may be an insulator. The substrate 110 may have openings AR1 and AR2. The openings AR1 and AR2 are provided with a plurality of openings. For example, the openings AR1 and AR2 may include a first opening AR1 and a second opening AR2. The first opening AR1 may be symmetrical with the second opening AR2. Electrode patterns 121, 126a, and 126b may be formed on the substrate 110. The electrode patterns 121, 126a, and 126b may be in a shape surrounded by the openings AR1 and AR2 as a whole.

The substrate 110 may include an outer substrate 110a and an inner substrate 110b. The outer substrate 110a may have a shape that surrounds the inner substrate 110b. The openings AR1 and AR2 may be located between the outer substrate 110a and the inner substrate 110b. The electrode patterns 121, 126a, and 126b may be located on the inner substrate 110b. Electrode pads 141, 142, 143, and 144 may be located on the outer substrate 110a. The electrode pads 141, 142, 143, and 144, for example, may be adjacent to each corner of the outer substrate 110a.

A first electrode pattern 121 located on the inner substrate 110b may generate heat. The heat generated by the first electrode pattern 121 may be used to form oxygen negative ions. When heat energy generated by the first electrode pattern 121 is transmitted to outside, energy loss may occur. The openings AR1 and AR2 located between the inner substrate 110b and the outer substrate 110a can prevent the heat generated in the inner substrate 110b from being conducted to the outer substrate 110a.

The openings AR1 and AR2 may have a rectangular shape. For example, the openings AR1 and AR2 may have a shape of a quadrilateral, a rectangle, a parallelogram, a trapezoid, or a combination thereof.

Bridges BR1 and BR2 may connect the outer substrate 110a to the inner substrate 110b. The bridges BR1 and BR2 may be provided with a plurality of bridges. Each of the bridges BR1 and BR2 may be located between the openings AR1 and AR2. The bridges BR1 and BR2 may include a first bridge BR1 and a second bridge BR2. Connection electrodes 131, 132, 133, and 134 may be located on the bridges BR1 and BR2.

The connection electrodes 131, 132, 133 and 134 located on the bridges BR1 and BR2 may electrically connect the electrode patterns 121, 126a and 126b located on the inner substrate 110b to the electrode pads 141, 142, 143, 144 located on the outer substrate 110a. For example, a first connection electrode 131 may connect one side of the first electrode pattern 121 to a first heating electrode pad 141. For example, a second connection electrode 132 may connect the other side of the first electrode pattern 121 to a second heating electrode pad 142. For example, a third connection electrode 133 may connect a second electrode pattern 126a to a second electrode pad 143. For example, a fourth connection electrode 134 may connect a third electrode pattern 126b to a third electrode pad 144.

Referring to FIG. 11, openings AR1, AR2 and AR3 may include a first opening AR1, a second opening AR2, and a third opening AR3. Bridges BR1, BR2 and BR3 may include a first bridge BR1, a second bridge BR2 and a third bridge BR3. Each of the bridges BR1, BR2, and BR3 may be located between the openings AR1, AR2, and AR3. The bridges BR1, BR2, and BR3 may connect an inner substrate 110b to an outer substrate 110a.

The first opening AR1 may be relatively adjacent to a first heating electrode pad 141 and a second heating electrode pad 142. The second opening AR2 may be relatively adjacent to the second heating electrode pad 142 and a third electrode pad 144. The third opening AR3 may be relatively adjacent to the first heating electrode pad 141 and a second electrode pad 143.

The first bridge BR1 may be located between the first opening AR1 and the third opening AR3. A first connection electrode 131 may be located on the first bridge BR1. The second bridge BR2 may be located between the first opening AR1 and the second opening AR2. A second connection electrode 132 may be located on the second bridge BR2. The third bridge BR3 may be located between the second opening portion AR2 and the third opening portion AR3. Third and fourth connection electrodes 133 and 134 may be located on the third bridge BR3.

Referring to FIG. 12, openings AR1, AR2, AR3 and AR4 may include a first opening AR1, a second opening AR2, a third opening AR3 and a fourth opening AR4. A substrate 110 may have a generally rectangular shape. Each of electrode pads 141, 142, 143, and 144 may be located at each corner of the substrate 110.

The first opening AR1 may be relatively adjacent to a first heating electrode pad 141 and a second heating electrode pad 142. The first opening AR1 may be formed in parallel with one side of the substrate 110 adjacent to the first heating electrode pad 141 and the second heating electrode pad 142.

The second opening AR2 may be relatively adjacent to the second heating electrode pad 142 and a third electrode pad 144. The second opening AR2 may be formed in parallel with one side of the substrate 110 adjacent to the second heating electrode pad 142 and the third heating electrode pad 144.

The third opening AR3 may be relatively adjacent to a second electrode pad 143 and the third electrode pad 144. The third opening AR3 may be formed in parallel with one side of the substrate 110 adjacent to the second electrode pad 143 and the third electrode pad 144.

The fourth opening AR4 may be relatively adjacent to the first heating electrode pad 141 and the second electrode pad 143. The fourth opening AR4 may be formed in parallel with one side of the substrate 110 adjacent to the first heating electrode pad 141 and the second electrode pad 143.

A first bridge BR1 may be located between the fourth opening AR4 and the first opening AR1. A second bridge BR2 may be located between the first opening AR1 and the second opening AR2. A third bridge BR3 may be located between the third opening AR3 and the fourth opening AR4. A fourth bridge BR4 may be located between the second opening portion AR2 and the third opening portion AR3.

The bridges BR1, BR2, BR3, and BR4 may extend from an inner substrate 110b and be connected to an outer substrate 110a.

Referring to FIG. 13, an inner substrate 110b may have a circular shape. An outer substrate 110a may be rectangular. The outer substrate 110a may form a circular hollow space at a center thereof. The inner substrate 110b may be located in the hollow space.

A substrate 110 may include openings AR1 and AR2. The openings AR1 and AR2 may be provided with a plurality of openings. For example, the openings AR1 and AR2 may include a first opening AR1 and a second opening AR2. The second opening AR2 may be relatively adjacent to a first heating electrode pad 141 and a second electrode pad 143. The first opening AR1 may be relatively adjacent to a second heating electrode pad 142 and a third electrode pad 144.

Bridges BR1 and BR2 may connect the inner substrate 110b to the outer substrate 110a. The bridges BR1 and BR2 may be located between the openings AR1 and AR2. A first connection electrode 131 and a second connection electrode 132 may be located on a first bridge BR1. A third connection electrode 133 and a fourth connection electrode 134 may be located on a second bridge BR2.

Referring to FIG. 14, a substrate 110 may include openings AR1, AR2, and AR3. The openings AR1, AR2 and AR3 may have a shape of a part of a circle or a part of a sector. A first opening AR1 may be located between a first connection electrode 131 and a second connection electrode 132. A second opening AR2 may be located between the second connection electrode 132 and a fourth connection electrode 134. A third opening AR3 may be located between a third connection electrode 133 and the first connection electrode 131. The third opening AR3 may be symmetrical with the second opening AR2.

Bridges BR1, BR2, and BR3 may connect an inner substrate 110b and an outer substrate 110a. The first connection electrode 131 may be located on a first bridge BR1. The second connection electrode 132 may be located on a second bridge BR2. The third connection electrode 133 and the fourth connection electrode 134 may be located on a third bridge BR3.

Referring to FIG. 15, a substrate 110 may include openings AR1, AR2, AR3, and AR4 having a shape of a part of a circle or a part of a sector. A first opening AR1 may be located between a first connection electrode 131 and a second connection electrode 132. A second opening AR2 may be located between the second connection electrode 132 and a fourth connection electrode 134. A third opening AR3 may be located between the fourth connection electrode 134 and a third connection electrode 133. A fourth opening AR4 may be located between the third connection electrode 133 and the first connection electrode 131.

Bridges BR1, BR2, BR3, BR4 may be located between the openings AR1, AR2, AR3, AR4. The first connection electrode 131 may be located on a first bridge BR1. The second connection electrode 132 may be located on a second bridge BR2. The third connection electrode 133 may be located on a third bridge BR3. The fourth connection electrode 134 may be located on a fourth bridge BR4.

A first electrode pattern 121 may have a shape formed by stacking a plurality of arcs. A second electrode pattern 126a and a third electrode pattern 126b may be disposed between the first electrode patterns 121. The second electrode pattern 126a and the third electrode pattern 126b may be spaced apart from the first electrode pattern 121.

Referring to FIG. 16, an outer substrate 110a may have a rectangular shape and an inner substrate 110b may have a circular shape. Bridges BR1, BR2, and BR3 may connect the inner substrate 110b to the outer substrate 110a. Openings AR1, AR2 and AR3 may be located between the bridges BR1, BR2 and BR3. A first connection electrode 131 may be located on a first bridge BR1. A second connection electrode 132 may be located on a second bridge BR2. A third connection electrode 133 may be located on a third bridge BR3.

Electrode pads 141, 142, and 143 may be located on one side of the outer substrate 110a. The electrode pads 141, 142, and 143 may include a first electrode pad 141 and 142 and a second electrode pad 143. The first electrode pad 141 and 142 may include a first heating electrode pad 141 and a second heating electrode pad 142.

Electrode patterns 121 and 126 may be located on the inner substrate 110b. One side of a first electrode pattern 121 may be electrically connected to the first heating electrode pad 141 through the first connection electrode 131. The other side of the first electrode pattern 121 may be connected to the second heating electrode pad 142 through the second connection electrode 132. One side of a second electrode pattern 126 may be connected to the second electrode pad 143 through the third connection electrode 133.

When a current flows through the first electrode pattern 121, the first electrode pattern 121 may generate heat. That is, if a potential of the first heating electrode pad 141 is different from a potential of the second heating electrode pad 142, the first electrode pattern 121 may generate heat. The heat generated in the first electrode pattern 121 may dissociate oxygen molecules in the air to form oxygen negative ions. The first electrode pattern 121 may wind. The second electrode pattern 126a may be adjacent to and spaced apart from the first electrode pattern 121.

The first heating electrode pad 141 may be a first sensing electrode pad 141. The second electrode pad 143 may be a second sensing electrode pad 143. In other words, the first sensing electrode pad 141, the first electrode pattern 121, the sensing layer 160 (see FIG. 2), the second electrode pattern 126, and the second sensing electrode pad 143 may form a part of a sensing circuit (not shown). By using the first heating electrode pad 141 as the first sensing electrode pad 141, power efficiency of the sensor 10 can be increased.

The sensing layer 160 (see FIG. 2) may have an electrical resistance between the first electrode pattern 121 and the second electrode pattern 126. The sensing layer 160 (see FIG. 2) may have a relatively low electrical resistance when it reacts with the gas, and a sensing circuit (not shown) may sense a change in the electrical resistance of the sensing layer 160 (see FIG. 2).

Referring to FIG. 17, an outer substrate 110a may have a hexagonal shape. An inner substrate 110b may have a circular shape. Electrode pads 141, 142, and 143 may be arranged to be symmetrical with respect to each other on the outer substrate 110a. Openings AR1, AR2, and AR3 may be arranged to be symmetrical with respect to each other on a substrate 110. The openings AR1, AR2, and AR3 may be arranged to be symmetrical with respect to the electrode pads 141, 142, and 143. The openings AR1, AR2 and AR3 and the electrode pads 141, 142 and 143 are arranged symmetrically so that the heat generated in the inner substrate 110b can be effectively prevented from being conducted to the outer substrate 110a.

Since the outer substrate 110a has the hexagonal shape, manufacturing costs of the substrate 110 can be reduced. Triangles, squares, and hexagons may be considered as a shape of the substrate 110. This is because the triangles, squares, and hexagons can continuously form a pattern on the substrate 110. Among the triangles, squares, and hexagons, the shape of the hexagon may be a shape closest to the shape of the circle.

FIG. 18 is a diagram illustrating a cross section of a sensor including a substrate on which an opening is formed according to an embodiment of the present invention.

Referring to FIG. 18, openings AR2 and AR3 may be passages for a gas. For example, an input gas may pass through a protective layer 170 through the openings AR2 and AR3 to reach or pass through a sensing layer 160. The openings AR2 and AR3 can smoothly move the gas flowing into and out of a sensor 10.

The input gas may include a target gas. A part of the input gas may make a chemical reaction in the sensing layer 160 to change the electrical properties of the sensing layer 160. For example, the part of the input gas can change the electrical resistance of the sensing layer 160.

The part of the input gas may escape to the outside of the protective layer 170. A part of the chemically reacted gas in the sensing layer 160 may escape to the outside of the protective layer 170. That is, an output gas may escape to the outside of the protective layer 170.

FIGS. 19 to 22 are diagrams illustrating examples of sensing effects of a sensor according to an embodiment of the present invention.

Referring to FIG. 19, a graph illustrating a temperature according to an input power is shown. In the graph, the dotted line indicates a case where there is no opening in a substrate, and the solid line indicates a case where there is an opening in the substrate. A temperature measurement point is one point of a sensing layer.

Referring to FIG. 19, even when the same power is applied, a relatively high temperature can be reached when an opening is provided in the substrate. In other words, a power required up to a target temperature in the case where there is an opening in the substrate may be lower than a power required up to a target temperature in the case where there is no opening in the substrate. For example, when the target temperature is 400° C., 160 mW of power is required when there is no opening in the substrate, but 120 mW of power may be required when there is an opening in the substrate.

Referring to FIG. 20, a resistance value of the sensing layer is shown in a graph according to each case. C11 and C12 are cases in which no nickel oxide is added to the sensing layer. C21 and C22 are cases in which nickel oxide is added to the sensing layer. C11 and C21 are cases in which the sensing layer does not react with the gas. C12 and C22 are cases in which the sensing layer reacts with the gas. The vertical axis of the graph shown in FIG. 20 may be expressed by a log-scale.

In the case of C11 and C12, the resistance values of the sensing layer are about 1 kΩ and 0.55 kΩ, respectively. In terms of sensitivity (a ratio of a resistance value in non-response to a resistance value in response), the sensitivity of the sensing layer is about 1.9 when nickel oxide is not added to the sensing layer.

In the case of C21 and C22, the resistance values of the sensing layer are about 42.5 kΩ and 13.7 kΩ, respectively. In terms of the sensitivity, the sensitivity of the sensing layer is about 3.1 when nickel oxide is added to the sensing layer.

From the graph of FIG. 20, the sensitivity of the sensing layer may be relatively high when nickel oxide is added to the sensing layer. When nickel oxide is added to the sensing layer containing tin oxide as described above, a relatively large number of depletion layers may be formed. That is, the depletion layer can affect the sensitivity of the sensing layer.

Referring to FIG. 21, resistance values with time are shown by dividing a case where there is a protective layer and a case where there is no protective layer. FIG. 21 (a) shows the case where there is no protective layer, and FIG. 21 (b) shows the case where there is the protective layer. In FIG. 21, the solid line represents the case where the sensing layer does not react with the gas, and the dotted line in FIG. 21 represents the case where the sensing layer reacts with the gas. In FIG. 21, data after a certain time has passed is displayed. For example, FIG. 21 displays data from 8 days after the sensor is activated.

Referring to FIG. 21 (a), the resistance value of the sensing layer decreases when the sensing layer does not react with the gas over time. Also, the sensitivity of the sensing layer decreases over time.

Referring to FIG. 21 (b), the resistance value of the sensing layer is relatively high when the sensing layer does not react with the gas over time. Also, the sensitivity of the sensing layer tends to be relatively constant over time.

Referring to the graph of FIG. 21, the protective layer can maintain the sensitivity of the sensing layer. As described above, the protective layer can remove the noise gas and protect the sensing layer from various pollutants. FIG. 21 shows this effect of the protective layer.

Referring to FIG. 22, sensitivity to various gases (G1, G2, G3) of the sensor is shown according to the concentration. For the various gases (G1, G2, G3), the sensors according to one embodiment of the present invention can indicate sensitivity. Therefore, it is possible to determine whether or not the sensor senses the gas by reflecting the data of FIG. 22 according to the gas to be measured.

Certain embodiments or other embodiments of the present invention described above are not mutually exclusive or distinct from each other. The certain embodiments or other embodiments of the present invention described above may be used together or combined with each other in configuration or function.

The present invention is not limited to the embodiments described, and it will be apparent to those skilled in the art that various modifications and variations can be made in the present invention without departing from the spirit and scope thereof. Accordingly, such modifications or variations are intended to fall within the scope of the claims of the present invention.

The invention claimed is:

1. A sensor comprising:
a substrate;
a first electrode pattern;
a second electrode pattern separated from the first electrode pattern;
a sensing layer located on one side of the substrate and covering the first electrode pattern and the second electrode pattern and containing a semiconductor;
a protective layer located on the one side of the substrate and covering at least a part of the sensing layer, and containing a material different from that of the sensing layer;
a first electrode pad disposed on the one side of the substrate to form a layer;
a second electrode pad disposed on the one side of the substrate;
a plurality of connection electrodes to electrically connect the first electrode pattern to the first electrode pad, and electrically connect the second electrode pattern to the second electrode pad; and
a housing accommodating the substrate and including a filter spaced apart from the substrate,
wherein the substrate includes an opening formed adjacent to an outer boundary of the first and second electrode patterns,
wherein the substrate further includes an inner substrate and an outer substrate having a shape that surrounds the inner substrate,
wherein the opening is located between the outer substrate and the inner substrate,
wherein the first and second electrode patterns are located on the inner substrate, and the first and second electrode pads are located on the outer substrate,
wherein a plurality of bridges connect the outer substrate to the inner substrate and are located between the opening and the plurality of connection electrodes located on the plurality of bridges,
wherein the substrate is formed by an anodized aluminum oxide (AAO),
wherein each of the first and second electrode patterns includes a serpentine portion to be overlapped at the inner substrate,
wherein the first electrode pattern is covered by an insulating layer,
wherein the second electrode pattern is disposed on the insulating layer,
wherein the sensing layer covers the second electrode pattern, and
wherein the protective layer includes silicon dioxide, aluminum oxide, palladium (Pd) and tungsten (W) and reacts with a hydroxyl group material.

2. The sensor of claim 1, wherein the first electrode pad includes:
a first heating electrode pad connected to one end of the first electrode pattern, and
a second heating electrode pad connected to other end of the first electrode pattern.

3. The sensor of claim 2, wherein when a potential difference between the first heating electrode pad and the second heating electrode pad is generated, the first electrode pattern heats the sensing layer.

4. The sensor of claim 2, wherein the first heating electrode pad, the first electrode pattern, the sensing layer, the second electrode pattern, and the second electrode pad sequentially form a sensing circuit.

5. The sensor of claim 2, further comprising:
a third electrode pattern formed on the one side of the substrate and separated from the first and second electrode patterns, and
a third electrode pad electrically connected to the third electrode pattern.

6. The sensor of claim 1, wherein the sensing layer includes tin dioxide and nickel oxide, and reacts with hydrofluorocarbon (HFC).

7. The sensor of claim 1, wherein the opening is provided with a plurality of openings,
wherein the first electrode pattern is extended between the plurality of openings and is connected to the first electrode pad, and
the second electrode pattern is extended between the plurality of openings and is connected to the second electrode pad.

8. The sensor of claim 1, wherein the housing further includes:
a plate facing the one side of the substrate and spaced apart from the substrate;
a first connection part being extended and formed from the plate and connected to the first electrode pad; and a second connection part being extended and formed from the plate and connected to the second electrode pad.

9. The sensor of claim 1, wherein the filter includes silicon dioxide and a carbon fiber.

10. The sensor of claim 1, wherein the opening is provided with a plurality of openings, and
the plurality of bridges are disposed between the plurality of openings.

11. The sensor of claim 1, wherein the inner substrate is one of a circular shape or a rectangular shape.

12. The sensor of claim 1, wherein the second electrode pattern is interdigitated with the first electrode pattern.

* * * * *